United States Patent [19]

LeBeouf

[11] Patent Number: 5,253,634
[45] Date of Patent: Oct. 19, 1993

[54] GRILLING APPARATUS

[76] Inventor: Darrell LeBeouf, P.O. Box 1895, Crowley, La. 70527-1895

[21] Appl. No.: 854,427

[22] Filed: Mar. 19, 1992

[51] Int. Cl.$^5$ .............................................. A47J 37/07
[52] U.S. Cl. .................................... 126/25 A; 99/447; 99/450; 126/25 R
[58] Field of Search ................. 99/339, 340, 401, 427, 99/450, 482, 446, 447; 126/9 R, 25 R, 25 A, 9 B

[56] References Cited

U.S. PATENT DOCUMENTS

| | | | |
|---|---|---|---|
| 2,386,815 | 10/1945 | Rubenstein | 126/25 A |
| 2,531,684 | 11/1950 | Jackson | 126/25 A |
| 2,541,528 | 2/1951 | McAvoy | 126/25 A |
| 2,996,597 | 8/1961 | Persinger et al. | 126/25 A |
| 3,088,395 | 5/1963 | Miller | 99/340 |
| 3,121,386 | 2/1964 | Persinger et al. | 99/446 |
| 3,151,609 | 10/1964 | Hastings, Jr. | 126/25 A |
| 3,398,733 | 8/1968 | Bradley | 126/25 A |
| 3,404,672 | 10/1968 | Arntz et al. | 99/450 |
| 3,683,791 | 8/1972 | Rast, Jr. | 99/447 |
| 3,943,837 | 3/1976 | Trkla | 99/401 |
| 4,034,662 | 7/1977 | McLane | 99/445 |

Primary Examiner—Timothy F. Simone
Attorney, Agent, or Firm—Pravel, Hewitt, Kimball & Krieger

[57] ABSTRACT

An outdoor grill apparatus, comprising four side walls, a floor portion, and a cover portion hingedly moveable between open and closed positions, the container defined by the walls and floor portion and cover defining the grilling area therein. Further there is provided a tray positioned adjacent the floor of the container for housing a quantity of coals or other heating elements for producing heat during grilling. The tray is moveable via a handle member positioned exterior to the container, which allows the tray to be positioned at various distances from the grilling surface, to regulate the amount of heat radiating to the meat to be grilled. There is further provided air channels positioned in the walls of the container so as to allow adequate air flow to the coals when the coals are in the various positions established by the exterior handle member.

15 Claims, 3 Drawing Sheets

GRILLING APPARATUS

BACKGROUND OF THE INVENTION

1. Field of the Invention

The apparatus of the present invention relates to outdoor grills. More particularly, the present invention relates to an outdoor bar-b-que grill which includes the capacity to raise and lower the tray of coals manually through a means exterior to the interior of the grill, and air flow vents to accommodate the flow of air through the grill while the coals are in the various positions.

2. General Background

In the art of outdoor grills with the use of coals to serve as the means to cook the food, it is beneficial to have the burning coals at a position to distribute heat to the food without burning the food being grilled. It is known that certain meats, such as beef and the like, require that the heat be relatively near the coals to provide the proper cooking results. However, other types of food would require that the coals be positioned a distance from the food being cooked for proper results.

It is known in the art that one may position the food being grilled at various locations from the coals. The most prominent means of accomplishing this is to allow the grill upon which the food rests to be adjustable to various heights. However, the shortcoming of this technique is that the grill, after a time, becomes very hot, and difficult to realign during the grilling procedure. Another means of adjusting the distance between the meat and the coals, is to adjust the height of the coals, themselves during the grilling process. However, one, when doing so is confronted with the similar problem of intense heat. Therefore, it would be beneficial if there was a means to reposition the food from the hot coals in such a manner in order to overcome this problem.

| PATENT NO. | INVENTOR | TITLE |
| --- | --- | --- |
| 633,056 | Sauton | French Patent |
| 2,531,684 | Jackson | "Portable Barbecue" |
| 2,541,528 | McAvoy | "Stove-Grill" |
| 3,121,386 | Persinger | "Barbecue Assembly" |
| 4,166,413 | Meszaros | "Barbecue" |
| 3,529,583 | Voges | "Fire Box Adjustor For Charcoal Broiler" |
| 3,943,837 | Trkla | "Dual Purpose Barbecue Grill And Rotisserie" |
| 3,398,733 | Bradley | "Combination Barbecue Smoker Leap Burner" |
| 3,151,609 | Hastings, Jr. | "Charcoal Cooker" |

Other objects of the invention will be obvious to those skilled in the art from the following description of the invention.

SUMMARY OF THE PRESENT INVENTION

The apparatus of the present invention solves the problems in the art in a simple and straightforward manner. What is provided is an outdoor grill apparatus, comprising four side walls, a floor portion, and a cover portion hingedly moveable between open and closed positions, the container defined by the walls and floor portion and cover defining the grilling area therein. Further there is provided a tray positioned adjacent the floor of the container for housing a quantity of coals or other heating elements for producing heat during grilling. The tray is moveable via a handle member positioned exterior to the container, which allows the tray to be positioned at various distances from the grilling surface, to regulate the amount of heat radiating to the meat to be grilled. There is further provided air channels positioned in the walls of the container so as to allow adequate air flow to the coals when the coals are in the various positions established by the exterior handle member.

Therefore, it is a principal object of the present invention to provide a grilling apparatus which allows the coals to be moved at various distances from the grilling surface;

It is a further object of the present invention to provide for the movement of the coals during grilling to various positions from the meat by movement of a handle member which is exterior to the interior of the grilling container;

It is a further object of the present invention to provide air flow channels in the walls of the grilling container so as to provide adequate air flow to the coals when the coals are in the various positions from the grilling surface.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
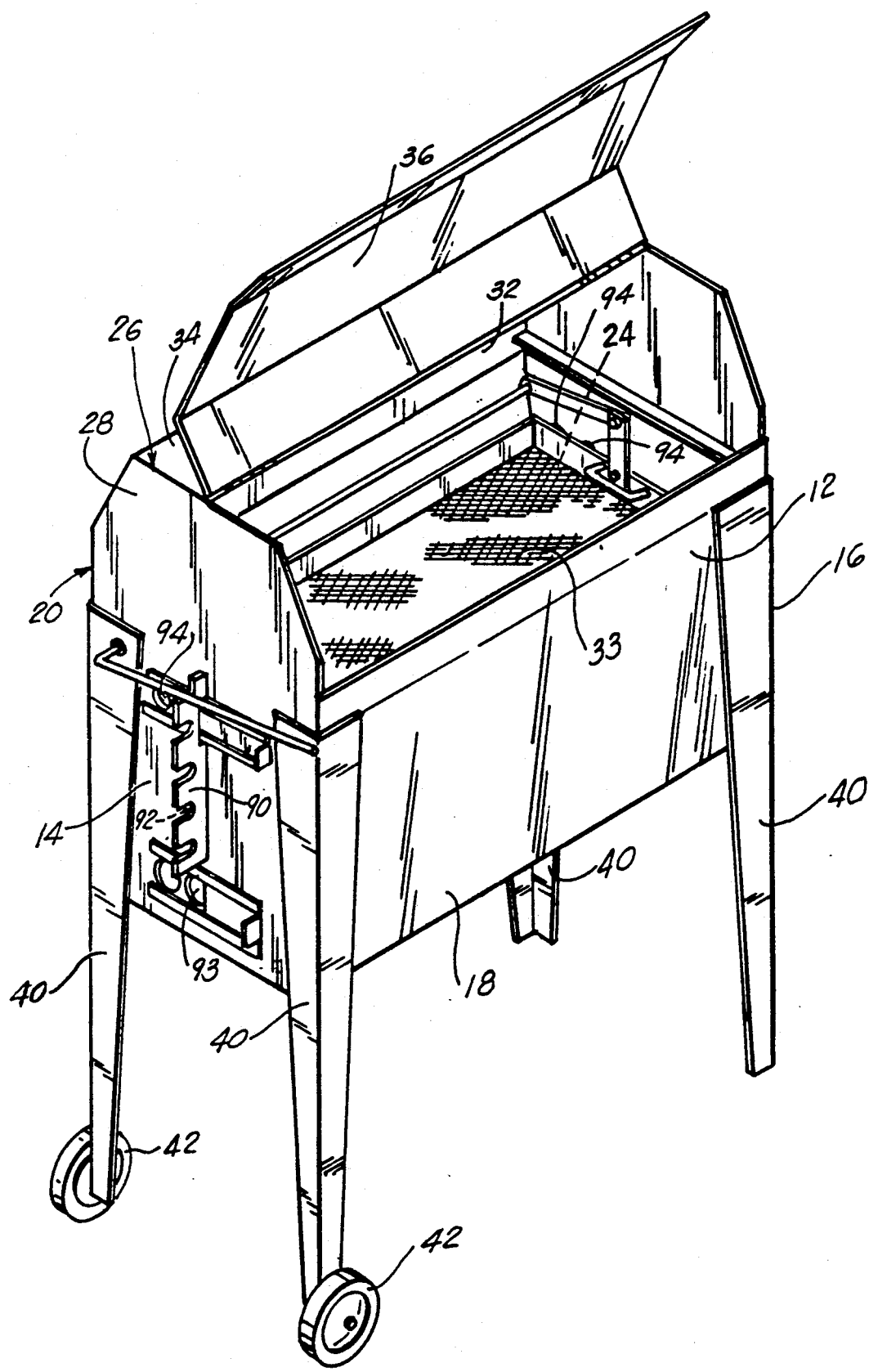
FIG. 1 illustrates an overall perspective view of the preferred embodiment of the apparatus of the present invention.

FIGS. 1 through 4 illustrate the preferred embodiment of the grilling apparatus of the present invention by the numeral 10. As illustrated, apparatus 10 comprises a grilling container portion 12, made up of a pair of side walls 14, 16 and a front wall 18 and a rear wall 20. The container 12 would include a floor portion 22, wherein there would be defined a grilling space 24 therewithin. Further, the container 12 would include an upper cover portion 26, which would comprise fixed sidewalls 28,30, a fixed rear wall 32, mating with a fixed upper wall 34, hingedly engaged to a moveable front cover 36, along a common edge 38, so that the cover 36 may move between a closed position, where the interior space 24 would be fully closed from the outside, to the open position, as illustrated in FIG. 1. The container portion would also include a grill surface 33 upon which the food to be grill is supported, and an area within the container, beneath the grill surface; to support the coals which are used during grilling, which radiate the heat upward to the food for grilling. The entire grilling apparatus 10 would be set upon a plurality of legs 40, each positioned at a corner to support the container portion 12 off the ground, and to provide stability to the container 12. Further, as illustrated each leg may include a wheel member 42 on its lowermost end 44, for providing ease of movement of the container.

Figure 4:
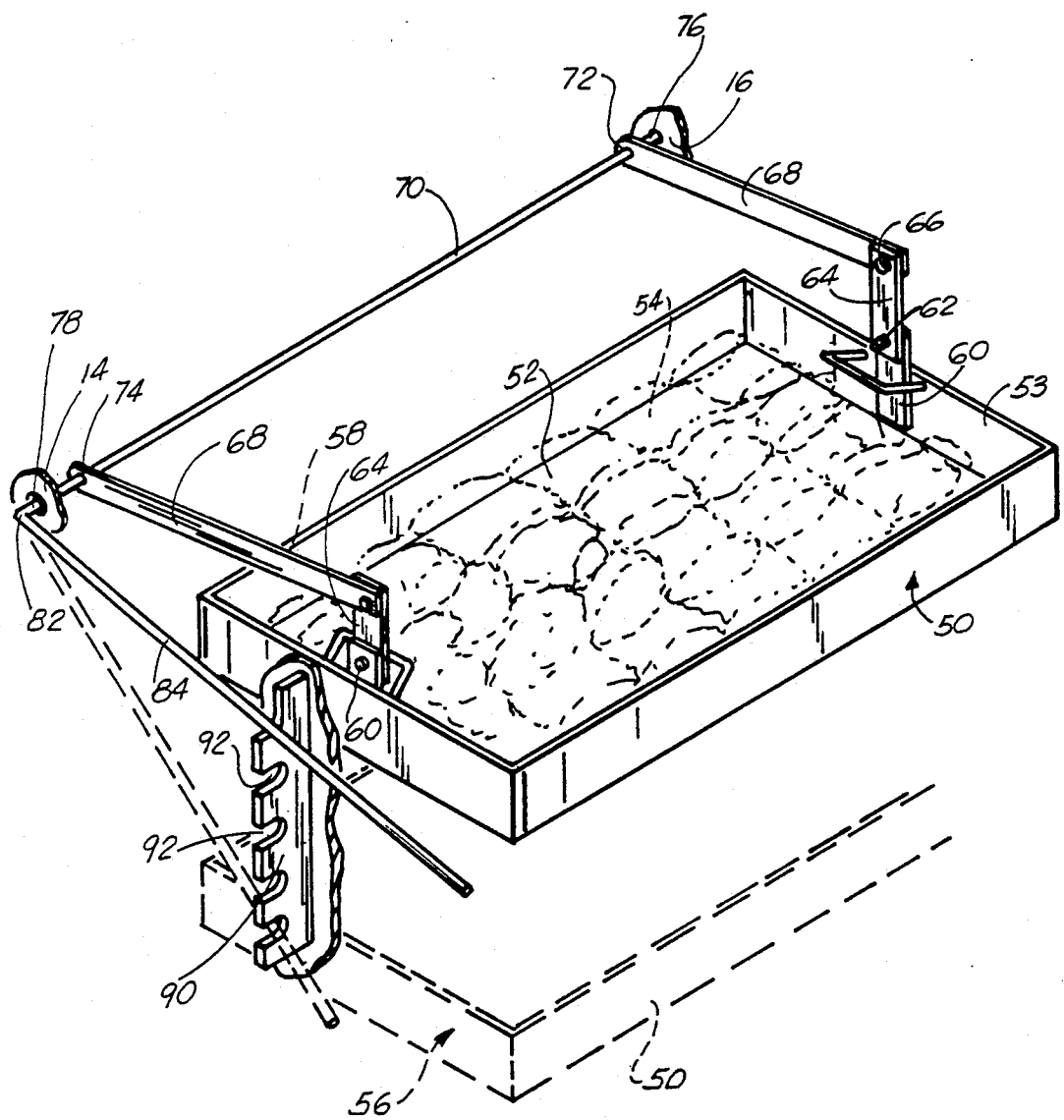
FIG. 4 illustrates a partial cutaway view of the adjustment mechanism in the preferred embodiment of the present invention.

It should be noted that the previous discussion of the components as recited are quite common in outdoor grilling apparatuses, and are well known in the art. However, as seen in the figures, particularly FIG. 4, there is further disclosed a tray member 50 which includes a solid floor portion 52, and a plurality of raised sidewalls 53 to define a coal space therewithin, for housing the coals 54. As illustrated in phantom view in FIG. 4, coal tray 50 would be moveable from a first lower most position, 56, wherein the coal tray 50 would be substantially resting on the floor 22 of container 12, and the coals would be furthest from the grilling surface 33, to the upper most position 58, as illustrated in FIG. 4, where the coals are positioned the closest to the grilling surface 33, for radiating the most intense heat to the food being grilled. In addition, the coal tray 50 may be positioned at intermediate positions between 56 and 58, as will be discussed further.

Figure 3:
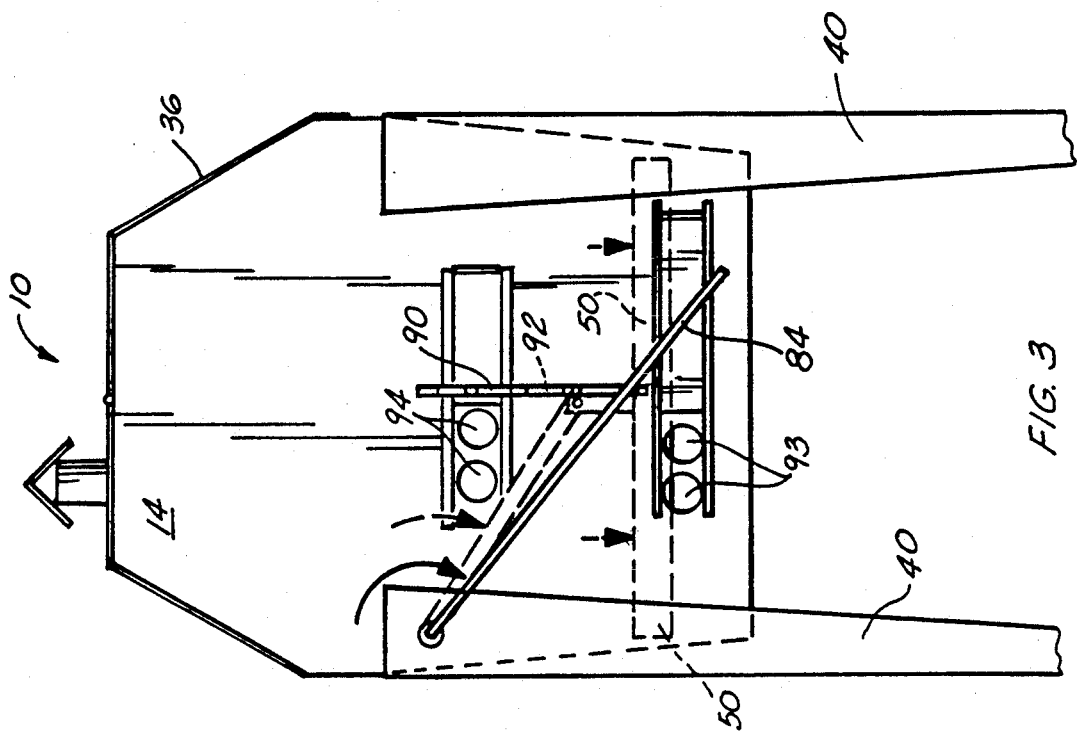
FIG. 3 illustrates a side view of the apparatus of the present invention with the adjustment handle member in the down most position.
Figure 2:
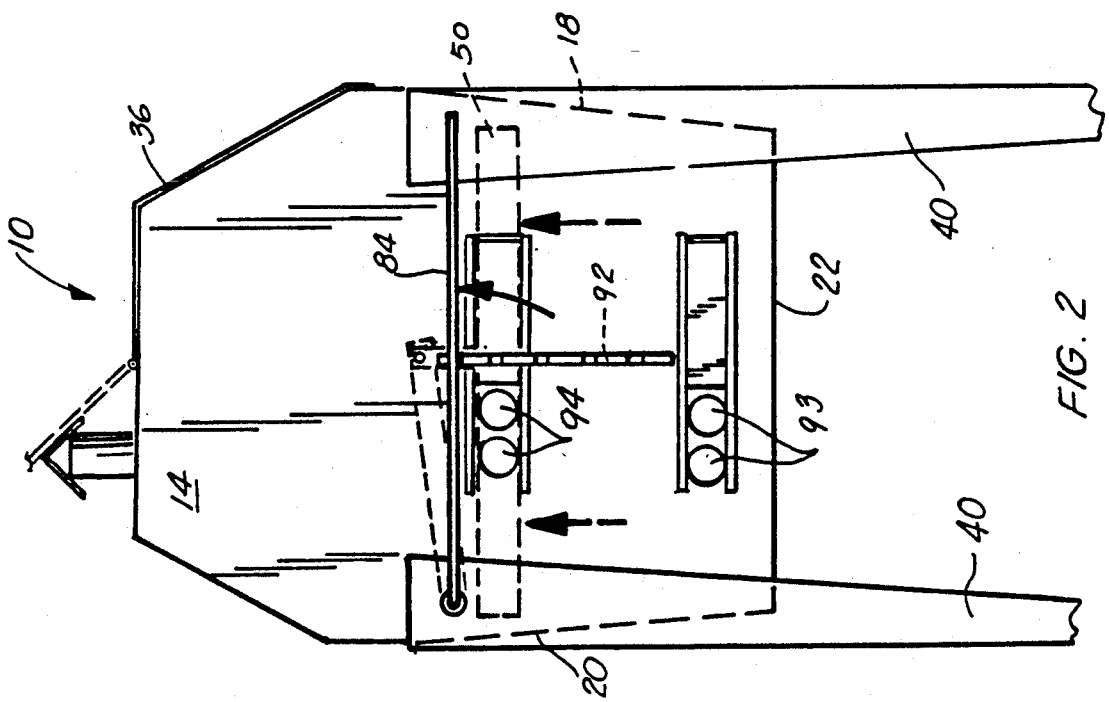
FIG. 2 illustrates a side view of the apparatus of the present invention with the adjustment handle member in the up most position.

As illustrated in the figures, particularly in FIGS. 2, 3, and 4, there is included a means for adjusting the height of coal tray 50 as previously described. This means provides first that coal tray 50 further comprise a pair of arm members 60, at each side wall of tray 50, with the arm members 60 hingedly engaged at hinge pins 62 to a connecting arm 64. The second end of connecting arms 64 are hingedly attached via pin 66 to extended arms 68, which in turn are fixedly attached, via welding or the like to rotating rod 70, at points 72, 74. One end 76 of rotating rod 70 rotates within the sidewall 16 of container 12, and the second end 78, extends through the second sidewall 14 of container 12, and may form an elbow turn at 82, to form a handle member 84, moveable along the exterior sidewall 14 as seen in the figures.

The handle member 84 upon rotation between up and down positions as seen in FIGS. 2 and 3 respectively, would impart rotation to rotating rod 70 extending across the length of the interior of container 12. Therefore, when rod 70 is rotated by handle member 84, the tray 50 would be moved from its lowest to its highest position, or vice versa, depending on the rotation of handle member 84. Further there is provided a means attached to the side wall 14 adjacent handle member 84 for engaging the handle member 84 during its upward and downward travel, and to secure it a desired height. This means would include a metal plate 90 having a plurality of notched openings 92 along its length, so that the handle 84, if desired may be slid into a particular notch 92, and in doing so, engaged within the notch 92, at a particular spot along its travel. This, of course, would secure coal tray 50 at a specific height from grilling surface 33, as desired. Therefore, the coals are being adjusted between various desired heights from the grilling surface 33, by a manipulating means which is exterior to the grilling space 24, and likewise not exposed to the intense heat during grilling. This would allow the user of the grill to raise and lower the grill during the grilling process, without fear of causing burns to ones skin if it had to be done in the conventional manner.

The problem confronted when the coals are adjustable as previously described is assuring that the coals, despite their position within container 12, are provided with adequate oxygen so that they burn with the desired intensity. This problem is solved by providing a plurality of air flow ports in the side walls 14, 16 of the container. The first set of ports 93 would be provided at substantially the floor portion of container 12, at the lowest travelling position of coal tray 50, to insure adequate oxygen flow at that position. Likewise, while the coals are in their upper most position, a second plurality of air ports 94 are provided in each side wall so that the coals are well oxygenated. It has been determined that positioning both sets of ports 93 and 94 as illustrated, provides the necessary oxygen flow to the coals at all positions desired.

As illustrated, the grilling apparatus 10 may be constructed of a suitable material, which could withstand the intense heat of grilling, and would be fabricated from, for example, sheet metal.

In addition, it is foreseen that the grills would be made of various sizes so that it could accommodate various quantities of food during grilling, and perhaps other variable features.

| Parts List: |
| --- |
| apparatus 10 |
| container portion 12 |
| side walls 14, 16 |
| front wall 18 |
| rear wall 20 |
| floor portion 22 |
| grilling space 24 |
| upper cover portion 26 |
| fixed sidewalls 28, 30 |
| rear wall 32 |
| upper wall 34 |
| front cover 36 |
| common edge 38 |
| grill surface 33 |
| legs 40 |
| wheel member 42 |
| lowermost end 44 |
| tray member 50 |
| floor portion 52 |
| raised side walls 53 |
| coals 54 |
| lower most position 56 |
| upper most position 58 |
| arm members 60 |
| hinge pins 62 |
| connecting arm 64 |
| pin 66 |
| arms 68 |
| rod 70 |
| points 72, 74 |
| end 76 |
| second end 78 |
| elbow 82 |
| handle member 84 |
| metal plate 90 |
| notched openings 92 |
| air ports 93 |
| air ports 94 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:
1. An apparatus for grilling food, comprising:
a) a container portion for housing heating elements, the container further comprising a plurality of sidewalls, a floor portion, and a top portion;
b) a grilling surface positioned within the container portion for placing the food to be grilled thereup;

c) a tray member housing the heating elements, such as coals;

d) a bar member extending and mounted between the sidewalls, the bar member further comprising a pair of parallel arm members, a first end of the parallel arm members secured to the bar member and a second end of the parallel arm members extending out and hingedly engaged to the tray member;

e) a handle member, attached to the bar member, the handle member positioned exterior to the container portion to impart rotational movement to the bar member as the handle member is moved upward and downward, so that the parallel arm members raise and lower the tray member within the container portion; and f) means for securing the handle member at a plurality of positions between its upper most and lower most positions, so that the tray member is secured at various positions from the grilling surface as desired.

2. The apparatus in claim 1, further comprising first and second plurality of air flow channels in the walls of the container portion to accommodate sufficient air flow through the container portion in spite of the position of the coal tray.

3. The apparatus in claim 1, wherein the plate means for engaging and securing the handle member in multiple positions further comprises a metal plate secured to the outer wall of the container portion, having a plurality of notched openings in its body for securing the arm of the handle securely.

4. The apparatus in claim 1, wherein the tray member may further comprise a pair of graspable handles for lifting the tray from the container when necessary.

5. The apparatus in claim 1, wherein the top portion is hingedly secured for raising and lowering during grilling of the food.

6. The apparatus in claim 1, wherein the positioning of the handle member exterior of the container defines a means to raise and lower the tray of coals and avoiding the intense heat of the tray itself.

7. An apparatus for grilling food, comprising:

a) a container portion for housing charcoal, the container further comprising a plurality of sidewalls, a floor portion, and a hingedly moveable top portion;

b) a grilling surface positioned within the container portion for placing the food to be grilled thereup;

c) a tray member housing the charcoal to be used to cook the food;

d) a bar member extended and mounted between the sidewalls, the bar member further comprising a pair of parallel arm members, a first end of the parallel arm members secured to the bar member and a second end of the parallel arm members extending out and hingedly engaged to the tray member;

e) a handle member, attached to the bar member, the handle member positioned exterior to the container portion and movable upward and downward, imparting rotational movement to the bar member, so that as the bar member is rotated by the handle member, the second end of the parallel arm members raise and lower the tray member within the container portion; and f) plate means secured to the exterior wall of the container, including a plurality of notched openings for securing the handle member at a plurality of positions between its upper most and lower most position when the handle member is engaged in one of the notched openings, so that the tray member is secured at various positions from the grilling surface as desired.

8. The apparatus in claim 7, further comprising first and second plurality of air flow channels in the walls of the container portion to accommodate sufficient air flow through the container portion in spite of the position of the coal tray.

9. The apparatus in claim 7, wherein the plate member for securing the handle member in multiple positions would be welded to the container wall in the general path of the moveable handle member.

10. The apparatus in claim 7, wherein the tray member may further comprise a pair of graspable handles for lifting the tray from the container when necessary.

11. The apparatus in claim 7, wherein the apparatus is generally constructed of sheet steel.

12. The apparatus in claim 7, wherein the positioning of the handle member exterior of the container defines a means to raise and lower the tray of coals while avoiding the intense heat of the tray itself.

13. The apparatus in claim 8, wherein the air flow channels provide sufficient air to the coals to maintain the coals in the heating condition necessary to grill the food despite the position of the tray.

14. An apparatus for grilling food, comprising:

a) a container portion for housing charcoal, the container further comprising a plurality of sidewalls, a floor portion, and a hingedly moveable top portion;

b) a grilling surface positioned within the container portion for placing the food to be grilled thereup;

c) a tray member housing the charcoal to be used to cook the food;

d) a bar member extended and mounted between the side walls, the bar member further comprising a pair of parallel arm members, a first end of the parallel arm members secured to the bar member and a second end of the parallel arm members extending out and hingedly engaged to the tray member;

e) a handle member, attached to the bar member, the handle member positioned exterior to the container portion and movable upward and downward, to impart rotational movement to the bar member, so that as the bar member is rotated by the handle member, the second end of the parallel arm members raise and lower the tray member with the container portion;

f) a plate secured to the exterior wall of the container, including a plurality of notched openings for securing the handle member at a plurality of positions between its upper most and lower most position when the handle member is engaged in one of the notched openings, so that the tray member is secured at various positions from the grilling surface as desired; and g) first and second plurality of air flow channels in the walls of the container portion to accommodate sufficient air flow through the container portion in spite of the position of the coal tray.

15. The apparatus in claim 14, wherein the coal tray may be manually removable from the container by disengaging the tray from the lifting means and lifting via the handle members on the end of the tray portion.

* * * * *